J. G. BAKER.
Slicing-Machine.

No. 210,078.  Patented Nov. 19, 1878.

Witnesses,
Henry Howson Jr.
Harry A. Crawford.

Inventor
John G. Baker
by his Attorneys
Howson and Son

N. PETERS, PHOTO-LITHOGRAPHER, WASHINGTON, D. C.

UNITED STATES PATENT OFFICE.

JOHN G. BAKER, OF PHILADELPHIA, PENNSYLVANIA, ASSIGNOR TO ENTERPRISE MANUFACTURING COMPANY.

IMPROVEMENT IN SLICING-MACHINES.

Specification forming part of Letters Patent No. 210,078, dated November 19, 1878; application filed August 19, 1878.

*To all whom it may concern:*

Be it known that I, JOHN G. BAKER, of Philadelphia, Pennsylvania, have invented new and useful Improvements in Slicing-Machines, of which the following is a specification:

My invention consists of a certain improvement, fully described hereinafter, in the slicing-machine for which Letters Patent No. 168,433 were granted to Caleb R. Turner, October 5, 1875.

Figure 2:
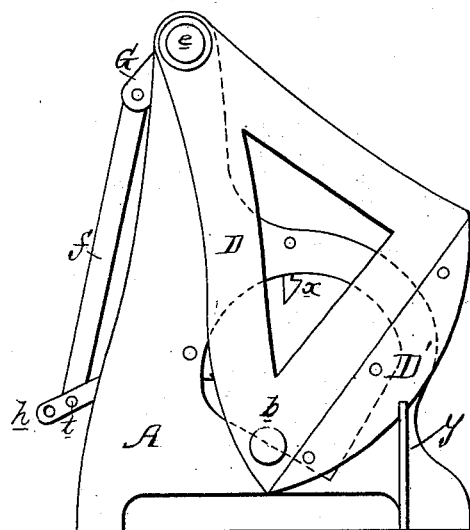
Figure 3:
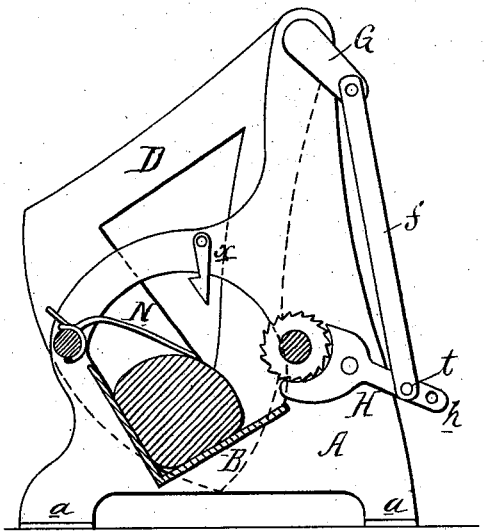
Figures 4, 9:
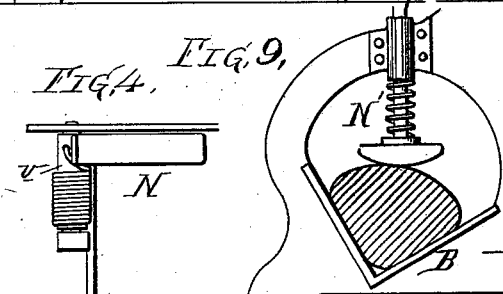
Figure 5:
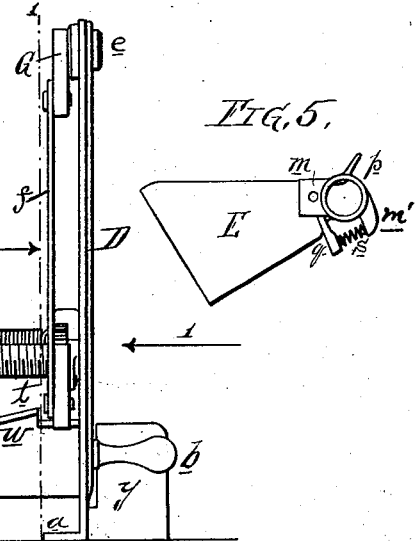
Figure 1:
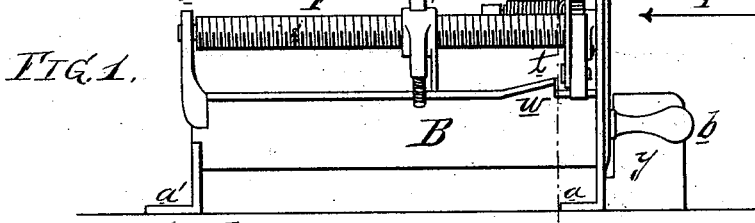
Figures 6, 7:
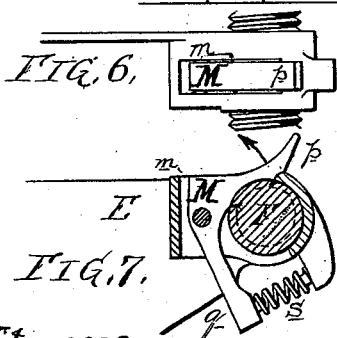
Figure 8:
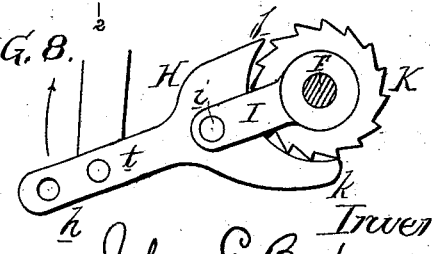

In the accompanying drawing, Figure 1 is a side view of my improved slicing-machine; Fig. 2, an end view, looking in the direction of the arrow 1, Fig. 1; Fig. 3, a vertical section on the line 1 2, Fig. 1, looking in the direction of the arrow 2; Fig. 4, a plan view of part of Fig. 1; Fig. 5, a view of the feeding-plate detached; Figs. 6 and 7, detached views of part of Fig. 5, drawn to an enlarged scale; Fig. 8, a view of the automatic feeding mechanism; and Fig. 9, a modification of one of the attachments.

The frame of the machine is composed partly of the end plate A, having suitable feet $a$, and partly of the trough B, composed of two inclined sides, supported by a foot, $a'$, and secured to the said plate, to the upper end of which is pivoted the knife-frame D, provided with a handle, $b$, and a blade, D', which is close to the outer face of the said plate A. E is the feed-plate or follower, arranged to fit snugly, but slide freely, in the trough B, and controlled by a screw-shaft, F, which bears at one end in the plate A and at the opposite end in a projection, $d$, on the outer end of the trough. This screw is operated simultaneously with the vibration of the knife-frame in the following manner: On the pin $e$, by which the said knife-frame is pivoted to the plate A, is an arm, G, which is connected by a rod, $f$, to the arm $h$ of a ratchet-lever, H, the latter being connected by a pivot-pin, $i$, to an arm, I, hung loosely to the screw-shaft F. When the ratchet-lever is moved in the direction of the arrow, Fig. 8, the dog $j$, forming a part of the said lever, will engage into the teeth of a ratchet-wheel, K, secured to the screw-shaft, and hence the latter will be turned to a limited extent; but on moving the ratchet-lever in a contrary direction, the dog $j$ will be released from the teeth of the ratchet-wheel, the arm $k$ of the lever bearing against the edge of the wheel without engaging into its teeth. This arrangement enables me to dispense with the usual spring-pawl, through the medium of which ratchet-wheels are generally operated.

The screw-shaft passes freely through a slotted projection, $m$, on the feed-plate E, to which is hung a bell-crank lever, M, part of the arm $p$ of the latter being threaded and adapted to the thread of the screw-shaft F, a spring, $s$, intervening between a part, $m'$, of the projection $m$ and an arm, $q$, on the bell-crank lever, and tending to maintain the threaded portion of that lever in gear with the screw-thread on the shaft.

When the feed-plate has to be moved quickly back the arm $p$ of the bell-crank lever is moved in the direction of the arrow, Fig. 7, when the threaded portion of the said arm will be out of gear with the screw-shaft and the feed-plate will be free from the control of the screw. It is important that the forward movement of the feed-plate should be discontinued before it reaches to within a given distance from the plate A, for which purpose I make an inclined projection, $w$, on the edge of the trough B, in a proper position in relation to the plate A, so that when the feed-plate approaches the latter plate the arm $q$ of the bell-crank lever will pass onto the inclined projection $w$, the threaded portion of the lever will be moved out of gear with the screw-shaft, and the further movement of the feed-plate will be discontinued. (See Fig. 1.)

In operating the machine on which my invention is an improvement, it has been usual to hold down the object to be sliced—a piece of dried beef, for instance—with the left hand, while the slicing-knife is vibrated by the right hand.

In order to obviate the necessity of performing the first duty, I hinge to the frame of the machine a spring-arm, N, which bears with a continuous pressure on the object to be sliced, as shown in Fig. 3, but permits the free feeding forward of the said object in the trough by the feed-plate. In the present instance, this spring-arm is secured to a spindle, $v$, having one bearing in the plate A and the other in a projection on one edge of the trough. A coiled spring, surrounding this spindle, has one end attached to the arm N and the other to the bearing on the edge of the trough, and tends to force the said arm downward, Fig. 4. The arm, however, may be retained in an elevated position by a catch, $x$, hung to the inner face of the plate A, Fig. 3. In place of this spring-arm a pressure-pad, N′, may be used, this pad being arranged to slide in a guide on the plate A, and being depressed by a spring or weight. (See Fig. 9.)

In operating the machine, the object to be sliced is fed forward in the trough by the devices explained above, and the knife-frame is vibrated, so as to slice off from the object so much of the latter as projects through an opening in the plate beyond the outer face of the same. As the slices are thrown to some distance from the machine, I use a projection, $y$, secured to or forming a part of the plate A. This projection, which may be slotted to receive the edge of the blade, is so situated as to act as a guard for retaining the slices within reasonable limits as they are cut off.

The arm $h$ of the ratchet-lever H should either be slotted or have a number of holes in it, for receiving the detachable pin $t$, so that the extent of movement of the lever, and consequently the extent of feed, may be varied. The arm G may also be slotted for the same purpose.

The plate A and pivoted knife, the trough for receiving the object to be sliced, the feed-plate adapted to the trough, and the feed-screw are contained in the aforesaid patented machine, and hence I lay no claim to these parts independently of my improvements; but

I claim as my invention—

The combination of the feed-screw, feed-plate, and spring-lever, pivoted to the latter and adapted to the screw, with a projection, $w$, on the frame, as described.

In testimony whereof I have signed my name to this specification in the presecence of two subscribing witnesses.

JOHN G. BAKER.

Witnesses:
HARRY A. CRAWFORD,
HUBERT HOWSON.